US009256824B2

(12) United States Patent  (10) Patent No.: US 9,256,824 B2
Cantin et al.  (45) Date of Patent: Feb. 9, 2016

(54) GUIDING METAHEURISTIC TO SEARCH FOR BEST OF WORST

(71) Applicants: Jason F. Cantin, Round Rock, TX (US); Michael A. Cracraft, Poughkeepsie, NY (US)

(72) Inventors: Jason F. Cantin, Round Rock, TX (US); Michael A. Cracraft, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/964,227

(22) Filed: Aug. 12, 2013

(65) Prior Publication Data

US 2015/0046379 A1   Feb. 12, 2015

(51) Int. Cl.
   *G06N 3/12*   (2006.01)
(52) U.S. Cl.
   CPC ..................................... *G06N 3/126* (2013.01)
(58) Field of Classification Search
   None
   See application file for complete search history.

(56) References Cited

U.S. PATENT DOCUMENTS

| | | |
|---|---|---|
| 2009/0307636 A1 | 12/2009 | Cases et al. |
| 2011/0161055 A1* | 6/2011 | Cases et al. ............. 703/1 |
| 2013/0153707 A1* | 6/2013 | Gate ..................... 244/3.15 |
| 2015/0046380 A1 | 2/2015 | Cantin et al. |

OTHER PUBLICATIONS

Herrmann, Jeffrey W., "A Genetic Algorithm for a Minimax Network Design Problem", Web site http://www.isr.umd.edu May 12, 1999, pp. 1-20.
Manda, Kalyani et al., "Population based meta-heuristic techniques for solving optimization: A selective survey", International Journal of Emerging Technology and Advanced Engineering; www.ijetae.com (ISSN 2250-2459, vol. 2, Issue 11 Nov. 2012, pp. 206-211.
Manisri, Tharinee et al., "Minimax optimisation approach for the Robust Vehicle Routing Problem with Time Windows and uncertain travel times", International Journal of Logistics Systems and Management Oct. 17, 2011, 1 page.
Yang, Ming-Hsien et al., "Hybrid Genetic Algorithms for Minimizing the Maximum Completion Time for the Wafer Probing Scheduling Problem", Journal of the Chinese Institute of Industrial Engineers vol. 22, Issue 3, 2005 2005, 2 pages.
"U.S. Appl. No. 14/041,438 Office Action", Jun. 16, 2015, 13 pages.

* cited by examiner

*Primary Examiner* — Jeffrey A Gaffin
*Assistant Examiner* — Mikayla Chubb
(74) *Attorney, Agent, or Firm* — DeLizio Law, PLLC

(57) ABSTRACT

Figures of merit by actual design parameters are tracked over iterations for candidate solutions that include both actual design parameters and actual context parameters. Instead of returning a current iteration figure of merit, a worst observed figure of merit for a set of actual design parameters is returned as the figure of merit for a candidate solution. Since the candidate solution includes both actual design parameters and actual context parameters and the worst observed figures of merit are tracked by actual design parameters, the figure of merit for a set of design parameters wilt be the worst of the observed worst case scenarios as defined by the actual context parameters over a run of a metaheuristic optimizer.

11 Claims, 7 Drawing Sheets

GUIDING METAHEURISTIC TO SEARCH FOR BEST OF WORST

BACKGROUND

Embodiments of the inventive subject matter generally relate to the field of computing, and, more particularly, to meta-heuristic optimization.

Software tools employ metaheuristic optimization algorithms to solve optimization problems. Metaheuristic optimization algorithms can be categorized as population-based and trajectory-based. Examples of population-based metaheuristic optimization algorithms include evolutionary algorithms (e.g., genetic algorithm, differential evolution), particle swarm optimization algorithms, ant colony optimization algorithms, and bee algorithms.

Metaheuristic optimization algorithms can be used to search a solution space for the best performing worst-case solution. That is, a designer may wish to optimize a design for situations where it is only the worst-case behavior that matters. For example, a designer might optimize an embedded circuit design to maximize performance under worst-case process variations and operating environment. As another example, a designer might optimize a system to minimize the worst-case power consumption.

Design problems have many variables. Some variables are under the control of the designer, such as wire length and or thickness. Other variables are outside the designer's control, such as manufacturing tolerances or environment variables (e.g., ambient temperature, humidity, data patterns, etc.). The worst-case environment for one design may not be the worst-case for another. Since the same set of environmental/manufacturing variables can have different impacts upon different designs, designers search for the worst-case scenario for each design under consideration. Also, the combined set of environment and manufacturing variables can lead to a design space that is quite large, and difficult or impossible to exhaustively explore.

SUMMARY

Embodiments of the inventive subject matter relate to guiding a population-based metaheuristic to search for a best of worst cases for an optimization problem. For each candidate solution in a current iteration of a population-based metaheuristic instance, it is determined whether a figure of merit generated from a fitness function of the population-based metaheuristic instance for the candidate solution is worse than a figure of merit associated with actual design parameters of the candidate solution in a structure used to track worst observed figures of merit by actual design parameters over iterations. The actual design parameters are a subset of actual parameters of the candidate solution. The structure is updated to associate the figure of merit with the actual design parameters when the figure of merit generated for the candidate solution in the current iteration is worse than a previously observed worst figure of merit for the actual design parameters in the structure. The worst between the figure of merit generated for the candidate solution in the current iteration and the previously observed worst figure of merit for the actual design parameters is supplied as a figure of merit to be used for the candidate solution in advancing the population-based metaheuristic instance.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
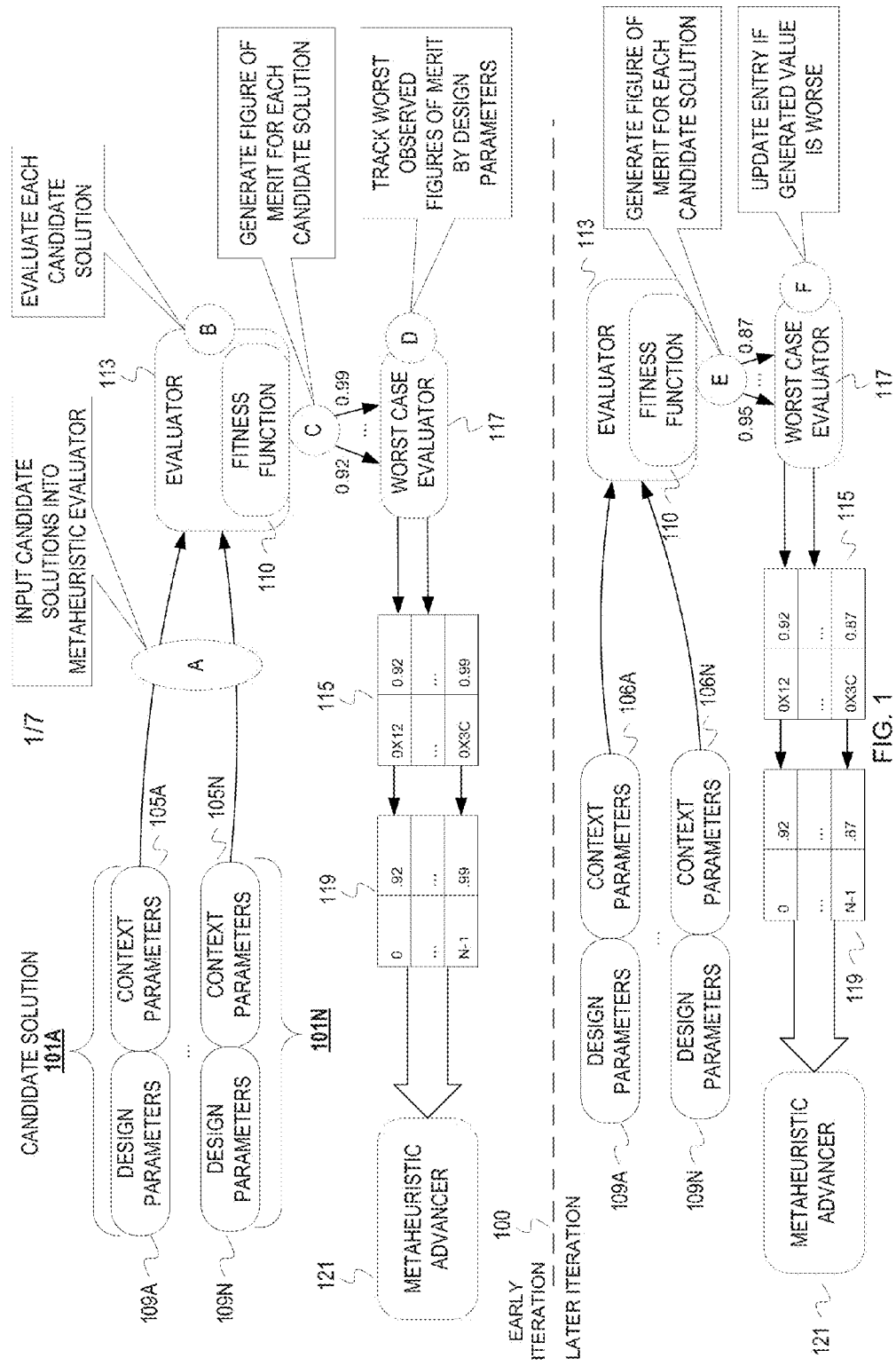
FIG. 1 depicts an example conceptual diagram of a population-based metaheuristic optimizer persisting worst observed figures of merit by actual design parameters.

The description that follows includes exemplary systems, methods, techniques, instruction sequences and computer program products that embody techniques of the present inventive subject matter. However, it is understood that the described embodiments may be practiced without these specific details. For instance, although examples refer to fitness functions, embodiments may employ another objective function that provides values for comparing candidate solutions. In other instances, well-known instruction instances, protocols, structures and techniques have not been shown in detail in order not to obfuscate the description.

TERMINOLOGY

Literature about metaheuristics or metaheuristic optimization uses a large variety of loosely defined terms that vary based on the particular metaheuristic algorithm being discussed. For instance, genetic algorithm and differential evolution algorithm literature refer to iterations as generations, a potential solution as an individual, and the quality of a solution within the context of a particular optimization problem as fitness. Particle swarm optimization algorithm literature refers to a potential solution as a bird or particle. Bee optimization algorithm literature refers to a solution as a food source and the quality or fitness of a solution for the particular optimization problem as a nectar amount. Despite the myriad of terms, population-based metaheuristic optimization algorithms evaluate potential solutions, and generate values that represent the quality of corresponding solutions with respect to a particular optimization problem. This description refers to the solutions that are evaluated as "candidate solutions." This description refers to a value that represents quality of a candidate solution for a particular optimization problem as a figure of merit. The term figure of merit is used within engineering for a quantity that characterizes performance of a design or measures a "degree of goodness" of a design with respect to alternatives. This description refers to the objective function (or group of functions) employed by a population-based metaheuristic algorithm to generate a figure of merit as a fitness function. This description refers to multiple candidate solutions under consideration together (e.g., in a same iteration) as a population.

Although a candidate solution can be understood to encompass program code, this description uses the terms "candidate solution" to refer to data or both data and program code. But a candidate solution, as used herein, does not refer solely to program code. A candidate solution can have a variety of structures (e.g., array, of values, list of parameters to be passed into a function/procedure, data structure, etc.). Although some examples of the structure of an individual are provided, the examples are not intended to limit the structure to that described, but are merely provided to help describe the inventive subject matter.

A population-based metaheuristic algorithm may operate on a single deme model or a multi-deme model. A deme refers to a local population unit. In a multi-deme model, a population of individuals is separated into sub-populations. Candidate solutions do not mix between demes of sub-populations unless migration is implemented. When separated into sub-populations, the term "generation" typically refers to all of the sub-populations in that generation. The context of this discussion is, generally, a population within a single deme model or a sub-population within a multi-deme model. The term "population" will be used, and when referring to another sub-population within the multi-deme model, the term "foreign population" will be used.

The data of candidate solutions include parameters. This description refers to design parameters and context parameters. Design parameters refer to the parameters of a design (e.g., wire length, spacing between wires, transmission rate, etc.). To comply with common use of the terms formal parameter and actual parameter, this description refers to actual design parameters when referring to actual parameters defined for a design (e.g., 10 millimeters, 1 Mb/s). The term context parameter is used herein to refer to an environment variable or manufacturing variables that is typically beyond control of a designer (e.g., ambient temperature, interference, data pattern, etc.).

Overview

The search space or problem space to search for an optimal solution in worst-case scenarios is large because two aspects are being searched for: 1) the worst cases, and 2) the best of those worst cases. This can also be expressed as searching for the best of the worst figures of merit. To find the worst figures of merit, the searching is driven towards solutions with the worst figures of merit based on an assumption that these worst figures of merit are occurring due to context parameters that correspond to worst-case scenarios (e.g., high interference). Although the search is driven toward solutions with lower figures of merit, a metaheuristic optimization algorithm advances with the best of these lower figures of merit.

One approach for driving the search for the best of the worst is to do a two-level nested optimization. The first level utilizes a metaheuristic optimizer (i.e., an executing instance of program code that implements a metaheuristic optimization algorithm) to determine the actual design parameters that result in optimal figures of merit. The fitness function of the first level then performs a second-level of optimization in which the actual design parameters are fixed based on the initial figures of merit from the first level. Another metaheuristic optimizer is used to determine the worst-case for the candidate solutions by searching the optimization problem space as defined by the context parameters for the fixed actual design parameters. The worst-case figures of merit generated by the second level of optimization are passed back for use by the first level of optimization.

A more efficient technique uses a structure (e.g., data structure to track figures of merit over iterations by actual design parameters for candidate solutions that include both actual design parameters and actual context parameters. Instead of returning a current iteration figure of merit, a worst observed figure of merit for a set of actual design parameters, which could be the current iteration figure of merit or a previously observed figure of merit, is returned as the figure of merit for a candidate solution. Since the candidate solution includes both actual design parameters and actual context parameters and the worst observed figures of merit are tracked by actual design parameters, the figure of merit for a set of design parameters will be the worst of the observed worst case scenarios as defined by the actual context parameters over a run of a metaheuristic optimizer. In other words, the search by the metaheuristic optimizer is guided by persisting worst observed figures of merit by actual design parameters.

DESCRIPTION OF EXAMPLE ILLUSTRATIONS

FIG. 1 depicts an example conceptual diagram of a population-based metaheuristic optimizer persisting worst observed figures of merit by actual design parameters. In this example depiction, the population-based metaheuristic optimizer includes an evaluator 113, a worst case evaluator 117, and a metaheuristic advancer 121. The evaluator 113 evaluates candidate solutions by simulating the candidate solutions. For example, the evaluator may simulate operation of an integrated circuit (IC) as defined by the actual parameters of a candidate solution and tinder conditions as defined by the actual context parameters of the candidate solution. Possible simulation by an evaluator can range from a network to a chip component. The worst case evaluator 117 maintains data to persist worst observed figures of merit by actual design parameters. The metaheuristic advancer 121 performs operations to advance the search to a next iteration. For example, the metaheuristic advancer 121 may perform reproduction and mutation operations if the metaheuristic optimizer is based on a genetic algorithm. The metaheuristic advancer 121 may adjust pheromone levels is the metaheuristic optimizer is based on an ant colony optimization algorithm. The depicted example operations in FIG. 1 are identified by a sequence of letters A-F that represent stages. Every possible operation of a metaheuristic optimizer is not depicted to avoid obfuscating the description. A line 100 separates depicted operations of different iterations. The operations above the line 100 are for an early iteration white the operations below the line 100 are a later iteration.

At stage A, candidate solutions are input into the evaluator 113. The candidate solutions include candidate solutions it 101A-101N. Each of the candidate solutions includes actual design parameters and actual context parameters. The candidate solution 101A includes actual design parameters 109A and actual context parameters 105A. The candidate solution 101N includes actual design parameters 109N and actual context parameters 105N. The candidate solutions 101A-101N may have been randomly generated or may be seed solutions (e.g., defined by a designer).

At stage B, the evaluator 117 evaluates each of the candidate solutions 101A-101N. If the actual design parameters define microprocessor, then the evaluator 117 simulates a microprocessor as defined by the actual design parameters in accordance with the actual context parameters. For instance, the actual context parameters 105A can include an actual ambient temperature parameter of 130 degrees Fahrenheit. And the evaluator 113 may generate one or more performance values that represent the behavior of the microprocessor design in a 130 degree Fahrenheit environment (e.g., maximum frequency before failure). The actual design parameters 109N can be the same as the actual design parameters 109A while the actual context parameters 105N include an actual context parameter of 95 degrees Fahrenheit.

At stage C, the evaluator 113 uses a fitness function 110 to generate figures of merit for each of the candidate solutions based on results of the evaluation. The fitness function 110 is defined to generate a figure of merit for a candidate solution based on 1:n values yielded from the evaluation by the evaluator. As one example, the fitness function 110 may generate a figure of merit based on a maximum processor frequency before failure. A more complex fitness function may generate a figure of merit with input of multiple evaluation results. For example, the fitness function 110 may generate a figure of merit based on input of maximum frequency before failure, time of operation, and instruction throughput.

At stage D, the worst case evaluator 117 tracks the worst observed figures of merit by design parameters. The worst case evaluator 117 uses a structure 115 to track the worst observed figures of merit by design parameters output by the fitness function 110. The structure 115 includes a plurality of entries, each of which at least identifies a set of actual design parameters associated with worst observed figure of merit for that set of actual design parameters. The worst case evaluator 117 uses a representation of each set of observed actual design parameters as an index into the structure 115. A variety of techniques can be employed to uniquely represent each different combination of actual design parameters that pass through the evaluator 117. For example, a hash function can be used to generate hashes for each different set of actual design parameters. As another example, the worst case evaluator 117 can also create a string for each different set of actual design parameters. The worst case evaluator 117 creates entries for each newly observed set of actual design parameters. When a set of actual design parameters are observed in later iterations, the corresponding worst observed figure of merit will be updated if worse than what is currently stored in the structure 115. In this example illustration, the fitness function 110 outputs a figure of merit of 0.92 for the candidate solution 101A and a figure of merit 0.99 for the candidate solution 101N. The worst case evaluator 117 creates an entry for the first candidate solution 109A with an index 0x12 that is generated from the actual design parameters 109A. The worst case evaluator 117 also creates an entry for the candidate solution 101N with an index 0x3C that is generated from the actual design parameters 101N. In this early iteration, the worst case evaluator 117 has not yet seen the set of actual design parameters 101A or 101N. Therefore, the figures of merit for these candidate solutions are written by the worst case evaluator 117 into the structure 115.

The figures of merit written into the structure 115 flow into a structure 119 that indicates figures of merit for a current population of candidate solutions. The metaheuristic advancer 121 uses the figures of merit in the structure 119 to perform the operations of the particular population-based metaheuristic optimization algorithm to advance the population of candidate solutions.

The operations of the tater iteration depicted below the line 100 focus on the actions of the evaluator 113 and the worst case evaluator 117. As in earlier iterations, multiple candidate solutions are input into the evaluator 113 for evaluation. In this later iteration, a first candidate solution includes the actual design parameters 109A and a set of actual context parameters 106A. A candidate solution N−1 includes the actual design parameters 109N and a set of actual context parameters 106N. The recurrence of the actual design parameters in the same order across iterations is merely for ease of illustration. Embodiments are not constrained to a strict ordering of candidate solutions by actual design parameters as may be (erroneously) inferred from the illustration. The evaluator 113 generates one or more simulation results fir each input candidate solution. At stage E, the evaluator 113 uses the fitness function 110 to generate a figure of merit for each of the candidate solutions based on the simulation results. In this later iteration, FIG. 1 depicts the fitness function 110 outputting a figure of merit 0.95 for the first candidate solution and a figure of merit 0.87 for the N−1 candidate solution.

At stage F, the worst case evaluator 117 updates entries in the structure 115 for previously observed actual design parameter if the figures of merit are worse. Although the first candidate solution, which includes the actual design parameters 109A and the actual context parameters 106A, is different than the candidate solution 101A, the worst case evaluator 117 has already observed the set of actual design parameters 109A. Likewise, the worst case evaluator has already observed the set of actual design parameters 109N even though the N−1 candidate solution is different than the candidate solution 101N. Since the actual design parameters 109A have already been observed, the structure 115 already has an entry indexed by 0x12. Likewise, the structure 115 already has an entry indexed by 0x3C for the actual design parameters 109N. Since 0.95 is better than the previously observed 0.92 for the actual design parameters 109N, the worst case evaluator will not persist the figure of merit 0.95. Instead, the figure of merit 0.92 will be passed to the structure 119 instead of the figure of merit 0.95. For the actual design parameters 109N, the figure of merit 0.87 for the candidate solution is worse than the previously observed figure of merit 0.99 for the candidate solution 101N. The worst case evaluator 117 updates the entry for the actual design parameters 109N with the new worst observed figure of merit 0.87. This figure of merit 0.87 passes to the structure 119. Thus, the metaheuristic advancer 121 will use 0.92 for the first candidate solution and 0.87 for the N−1 candidate solution.

Each of the evaluator 113, the worst case evaluator 117, and the metaheuristic advancer 121 are example modules that implement a different aspect of the metaheuristic optimizer. These are depicted as modules to simplify depiction of the executing instance of program code performing one or more functions. Although depicted as disparate modules, the functionality represented by the modules can be implemented as a single monolithic block of program code, library files, application programming interface functions, etc. For instance, the evaluator 113 is depicted as including the fitness function 110. Implementation, however, can vary. The fitness function 110 can be a separately defined block of program code method, procedure, function, etc.). The evaluator 113 may pass the results of simulation as parameters via library or API call. The evaluator 113 may pass the results of simulation to another module that manages the different aspects of a metaheuristic optimizer.

Figure 2:
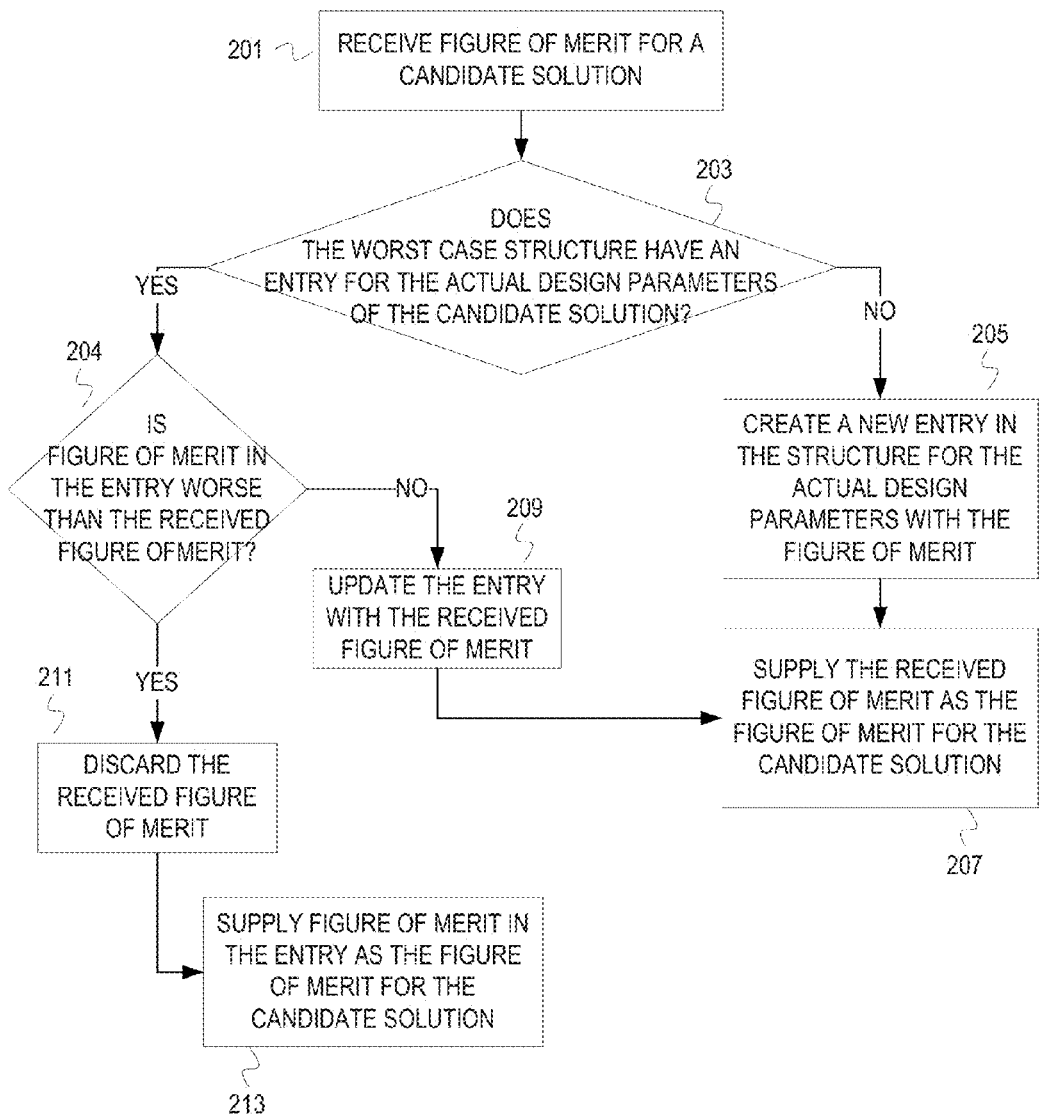
FIG. 2 depicts a flowchart of example operations for persisting the worst observed figure of merit across progression of a population-based metaheuristic optimizer.

FIG. 2 depicts a flowchart of example operations for persisting the worst observed figure of merit across progression of a population-based metaheuristic optimizer. The example operations of FIG. 2 are those that would be performed by the program instructions that receive output from a fitness function and output to program instructions that progress a population of candidate solutions. For instance, the example operations would be performed by program instructions represented by the worst case evaluator in FIG. 1.

At block 201, a figure of merit is received for a candidate solution. For example, a block of program instructions is invoked by name with the figure of merit and the candidate solution passed as parameters, either literally or referentially. As another example, a process that persists the worst observed figures of merit by actual design parameters ("worst case evaluator process") may be running separately from a process that implements the fitness function. In that case, the process that implements the fitness function transmits one or more data packets that convey the candidate solution and the corresponding figure of merit to the worst case evaluator process.

At block 203, it is determined whether the structure with the worst observed figures of merit by actual design parameters (hereinafter "worst case structure") has an entry for the actual design parameters of the candidate solution. For example, the worst case evaluator process generates a representative value (e.g., identifier or index) for the set of actual design parameters of the candidate solution. The worst case evaluator process may construct a string with the set of actual design parameters, may generate a hash value, etc. The worst case evaluator process then accesses the worst case structure with this identifier/index. The worst case evaluator process may compare the identifier against each entry to look for a match in a variable size worst case structure (e.g., tree, linked list, etc.), for example. The worst case evaluator process may index into the worst case structure with the generated representation in a fixed size worst case structure (e.g., array, hash table, etc.). As another example, the worst case evaluator process may use each actual design parameter of the set of actual design parameters as an index into a multi-dimensional worst case structure. If the worst case structure contains an entry for the actual design parameters, then control flows to block 204. If the worst case structure does not contain an entry for the actual design parameters, then control flows to block 205.

At block 205, a new entry is created in the worst case structure for the set of actual design parameters with the figure of merit. Creating the new entry may involve allocation of additional memory in a variable sized worst case structure, or population of values into a fixed sized worst case structure.

At block 207, the received figure of merit is supplied as the figure of merit for the candidate solution to the process that advances the population of candidate solution. For example, the worst case evaluator process may pass the figure of merit and an indication of the candidate solution (or the candidate solution itself) to the metaheuristic advancer via inter-process communication, network packets, etc. In other implementation, the worst case evaluator process writes the figure of merit into a structure for candidate solutions of a current iteration.

If the worst case structure has an entry for the set of actual design parameters as determined at block 203, then control flowed to block 204. At block 204, it is determined whether the figure of merit in the entry is worse than the received figure of merit. If the figure of merit current associated in the worst case structure with the set of actual design parameters is worse than the received figure of merit, then control flows to block 211. Otherwise, control flows to block 209.

At block 211, the received figure of merit is discarded. The figure of merit can be added to a heap for removal, immediately deleted, marked for deletion, etc.

At block 213, the figure of merit in the entry is supplied as the figure of merit for the candidate solution. The received figure of merit can be supplied with various techniques as described with respect to block 207.

If the received figure of merit was determined to be worse than the figure of merit in the entry at block 204, then control flowed to block 209. At block 209, the entry is updated with the received figure of merit. The worst case evaluator process overwrites the figure of merit in the entry with the received figure merit, thus updating the worst case structure to indicate the worst observed figure of merit for the set of actual design parameters. Embodiments do not necessarily overwrite the previous worst observed figure of merit. Embodiments may maintain a history of some or all of the figures of merit observed for a set of actual design parameters. Control flows from block 209 to block 207.

Figure 3:
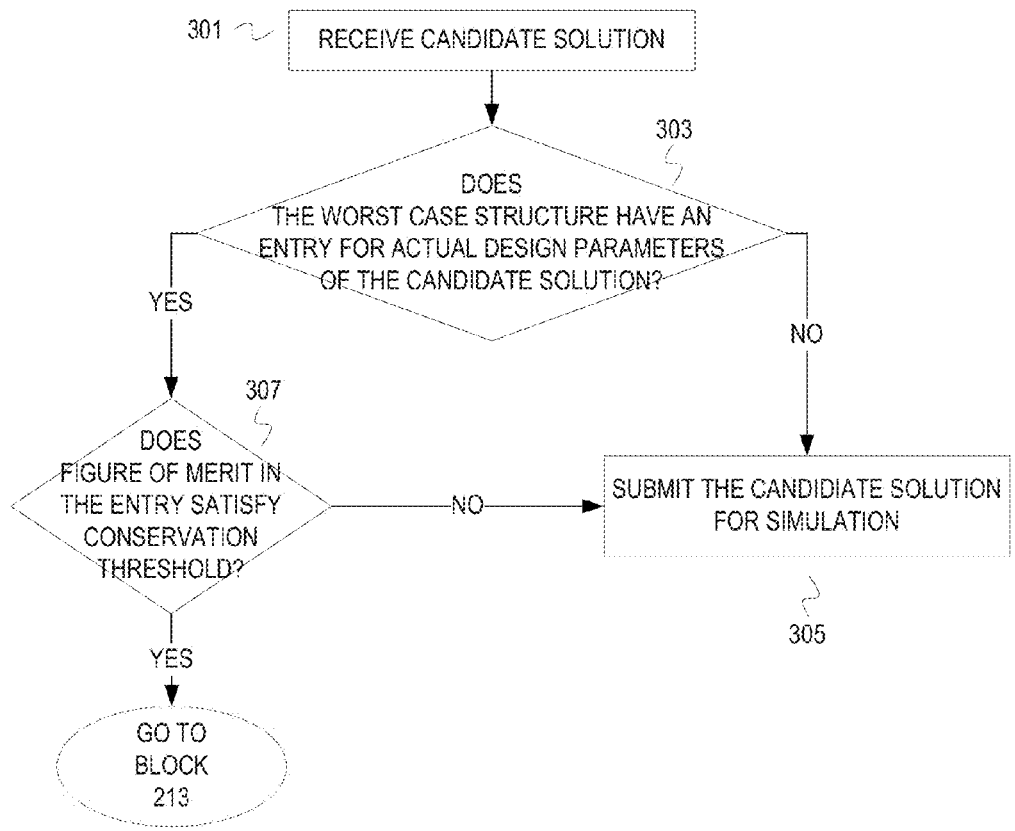
FIG. 3 depicts a flowchart of example operations that avoid evaluation of candidate solutions with actual design parameters with previously observed worst figures of merit already below a threshold (hereinafter "conservation threshold").

A threshold can also be employed to avoid evaluation of some candidate solutions. The worst case structure can be used with a threshold to short circuit evaluation of candidate solutions. FIG. 3 depicts a flowchart of example operations that avoid evaluation of candidate solutions with actual design parameters with previously observed worst figures of merit already below a threshold (hereinafter "conservation threshold"). The example operations are performed on candidate solutions prior to the candidate solutions being submitted for simulation. This short circuit technique conserves resources used for simulation and the fitness function.

At block 301, a candidate solution is received. The candidate solution may be passed into a function that implements candidate solution simulations. The candidate solution may be passed into a pre-processing function that determines whether evaluation can be skipped and avoid passing the candidate solution into an evaluator.

At block 303, it is determined whether the worst case structure has an entry for the actual design parameters of the received candidate solution. If an entry does not already exist, then control flows to block 305. If an entry already exists, then control flows to block 307.

At block 307, it is determined whether the figure of merit in the entry satisfied a conservation threshold. If a figure of merit is already too tow for further consideration by the metaheuristic optimizer, then resources can be conserved by not further searching for an even worse figure of merit. The conservation can be defined as an absolute threshold. For example, the absolute conservation threshold may be defined as 0.4 when figures of merit can range from 0 to 1. Embodiments can also define a dynamic conservation threshold that is based on a fitter candidate solution. For instance, the dynamic conservation threshold can be defined as 10% of a greatest figure of merit observed so far in a current iteration. If a candidate solution has actual design parameters with a worst observed figure of merit that is 10% or less of a figure of merit for a current frontrunner in the current iteration. If the figure of merit in the entry satisfies the conservation threshold, then control flows to block 213 of FIG. 2. Otherwise, control flows to block 305.

At block 305, the candidate solution is submitted for simulation. The candidate solution is passed to a metaheuristic evaluator for simulation and generation of a figure of merit.

Figure 4:
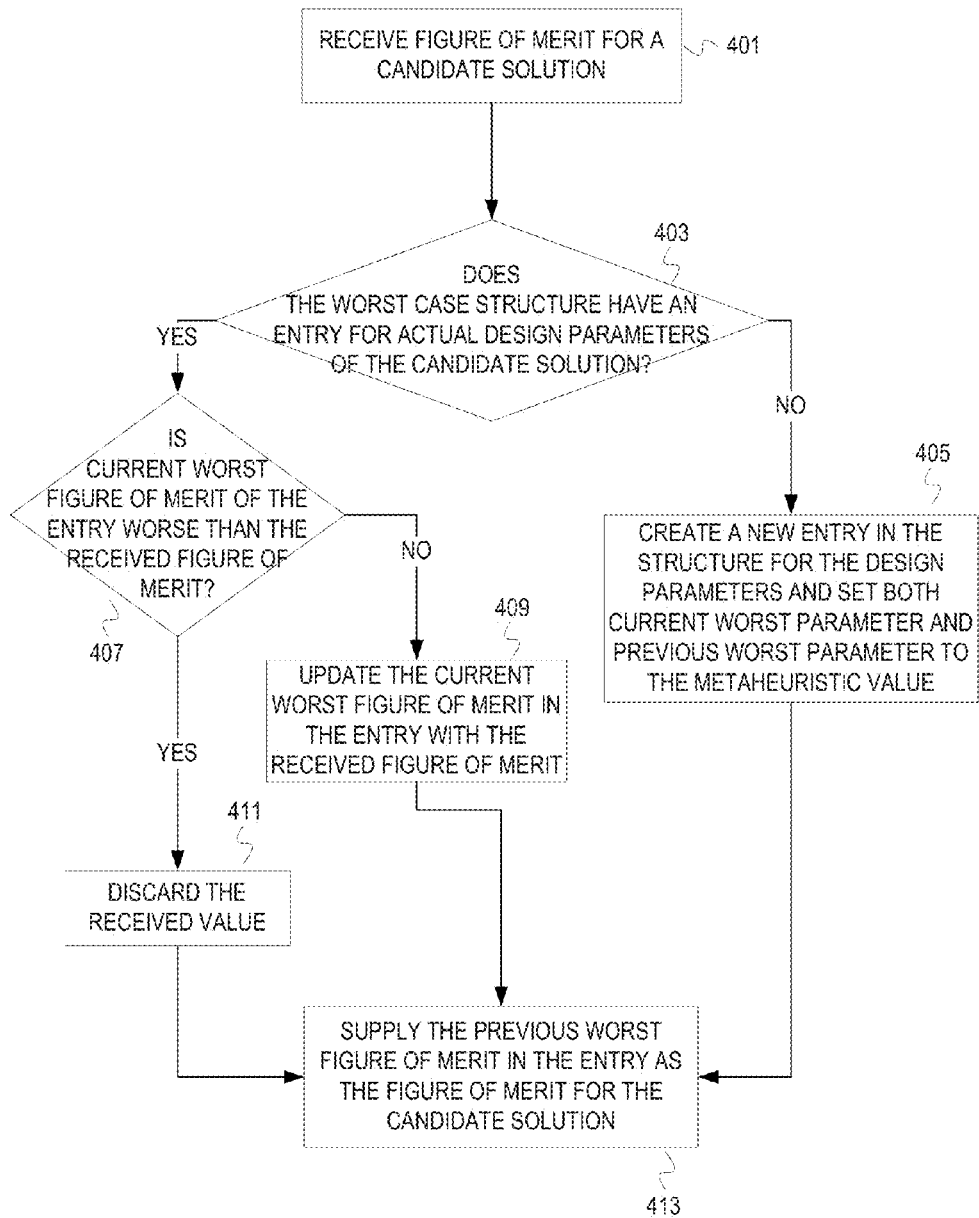
FIG. 4 depicts a flowchart of example operations to enforce consistency of worst observed figure of merit across observed same sets of actual design parameters within an iteration.

Within an iteration, multiple candidate solutions may have a same set of actual design parameters. This can lead to different figures of merit being supplied to the advancing stage for the different candidate solution with the same set of actual design parameters. To enforce consistency within an iteration, the previously observed figure of merit for a set of actual design parameters can be supplied for population advancement. After figures of merit have been generated for the candidate solutions in a current iteration, the worst figure of merit across candidate solutions within the current iteration having a same set of actual design parameters can be stored in the worst case structure if worse than the previously observe figure of merit. FIG. 4 depicts a flowchart of example operations to enforce consistency of worst observed figure of merit across observed same sets of actual design parameters within an iteration. The example operations of FIG. 4 are similar to those in FIG. 2. The example operations of FIG. 4 differ with respect to how the worst case structure is maintained as depicted in blocks 407, 405, and 409.

At block 401, a figure of merit is receive for a candidate solution. For example, a block of program instructions is invoked by name with the figure of merit and the candidate solution passed as parameters, either literally or referentially. As another example, worst case evaluator process may be running separately from a process that implements the fitness function, in that case, the process that implements the fitness function transmits one or more data packets that convey the candidate solution and the corresponding figure of merit to the worst case evaluator process, At block 403, it is determined whether the structure with the worst observed figures of merit by actual design parameters (hereinafter "worst case structure") has an entry for the actual design parameters of the candidate solution. For example, the worst case evaluator process generates a representative value (e.g., identifier or index) for the set of actual design parameters of the candidate solution. The worst case evaluator process may construct a string with the set of actual design parameters, may generate a hash value, etc. The worst case evaluator process then accesses the worst case structure with this identifier/index. The worst case evaluator process may compare the identifier against each entry to look for a match in a variable size worst case structure (e.g., tree, linked list, etc.), for example. The worst case evaluator process may index into the worst case structure with the generated representation in a fixed size worst case structure (e.g., array, hash table, etc.). As another example, the worst case evaluator process may use each actual design parameter of the set of actual design parameters as an index into a multi-dimensional worst case structure. If the worst case structure contains an entry for the actual design parameters, then control flows to block 407. If the worst case structure does not contain an entry for the actual design parameters, then control flows to block 405.

At block 405, a new entry is created in the worst case structure for the set of actual design parameters with the figure of merit. The figure of merit is set as both the current worst observed figure of merit and the previous worst observed figure of merit. The current worst observed figure of merit is the worst figure of merit observed in the current iteration for the set of actual design parameters. The previous worst observed figure of merit is the worst figure of merit observed for the set of actual design parameters prior to the current iteration. Since the set of actual design parameter have not yet been observed, then the received figure of merit is used as both values. Creating the new entry may involve allocation of additional memory in a variable sized worst case structure, or population of values into a fixed sized worst case structure. Control flows from block 405 to block 413.

If the worst case structure has an entry for the set of actual design parameters as determined at block 403, then control flowed to block 407. At block 407, it is determined whether the current worst observed figure of merit of entry is worse than the received figure of merit. If the current worst observed figure of merit in the entry is worse than the received figure of merit, then control flows to block 411. If the received figure of merit is worse than the current worst observed figure of merit in the entry, then control flows to block 409.

At block 411, the received figure of merit is discarded. The figure of merit can be added to a heap for removal, immediately deleted, marked for deletion, etc. Control flows from block 411 to block 413.

If the received figure of merit was determined to be worse than the current worst observed figure of merit in the entry at block 407, then control flowed to block 409. At block 409, the entry is updated with the received figure of merit as the current worst observed figure of merit. The worst case evaluator process overwrites the current worst figure of merit in the entry with the received figure merit, thus updating the worst case structure to indicate the worst observed figure of merit for the set of actual design parameters within the current iteration. Control flows from block 409 to block 413.

At block 413, the previous observed worst figure of merit in the entry is supplied as the figure of merit for the candidate solution to the process that advances the population of candidate solution. For example, the worst case evaluator process may pass the previous worst observed figure of merit and an indication of the candidate solution (or the candidate solution itself) to the metaheuristic advancer via inter-process communication, network packets, etc. In other implementation, the worst case evaluator process writes the previous worst observed figure of merit into a structure for candidate solutions of a current iteration used by the metaheuristic advancer. Effectively, the metaheuristic advancer will use the same worst figure of merit observed up to the current iteration across candidate solutions in the current iteration having the same set of actual design parameters. Possible delay of a figure of merit that is worse than a previous observed figure of merit allows enforcement of consistency across the candidate solutions with the same set of actual design parameters. This reduces the chances of propagating actual context parameters that do not define worst case scenarios. In other words, this consistency constraint reduces the chances of the metaheuristic optimizer being "distracted" by a candidate solution with actual context parameters that define an easier environment and/or manufacturing variables than a candidate solution with actual context parameters that define a worse situation.

Figure 5:
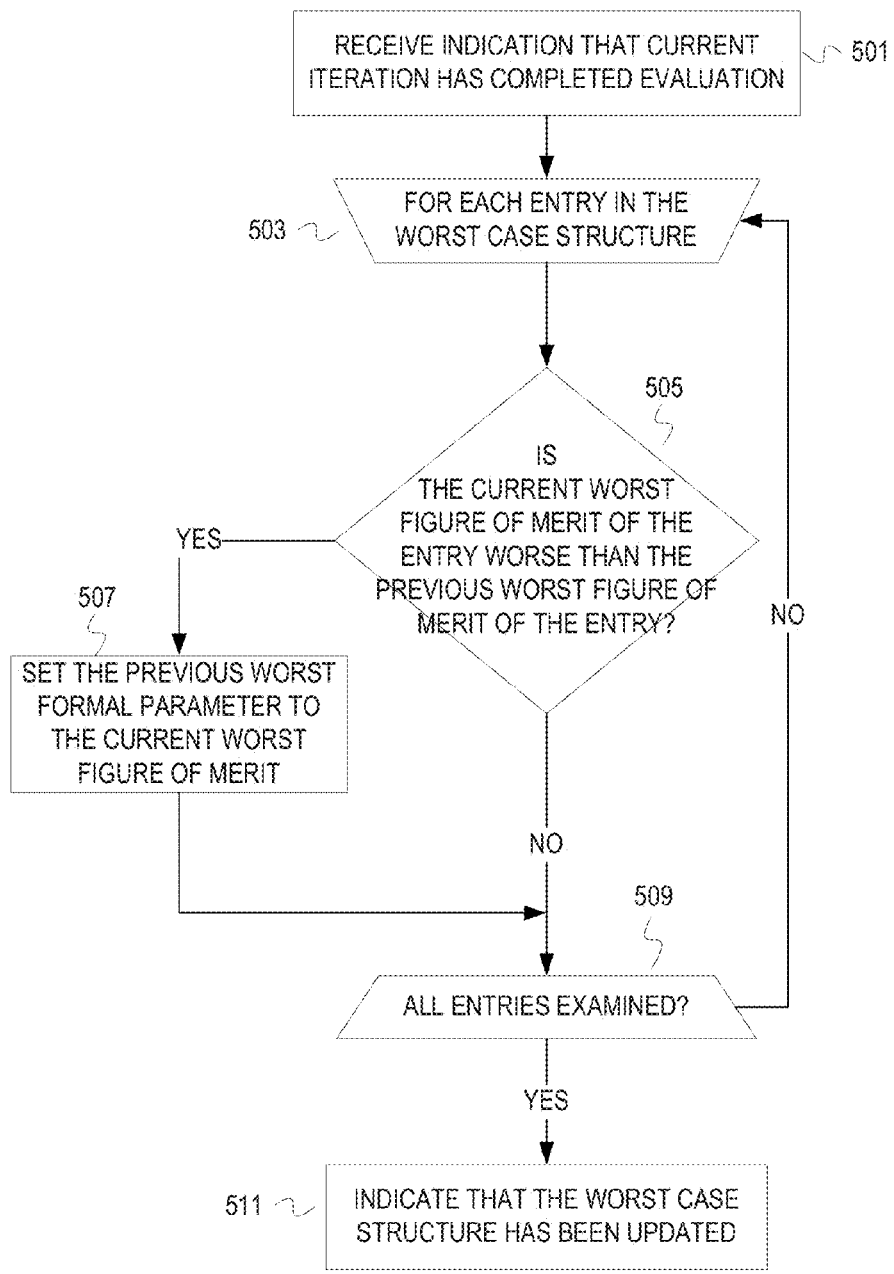
FIG. 5 depicts an example flowchart of operations for updating the previous observed worst figure of merit.

To enforce consistency, figures of merit are observed across the candidate solutions of a current iteration before updating the previous worst observed figure of merit. FIG. 5 depicts an example flowchart of operations for updating the previous observed worst figure of merit.

At block 501, an indication that a current iteration has completed evaluation is received. For example, the worst case evaluator process receives a communication from the metaheuristic evaluator process that the last candidate solution of the current iteration has been evaluated and a figure of merit generated therefor. As another example, the worst case evaluator process periodically checks for a flag to be set by the metaheuristic evaluator that indicates completed evaluation for an iteration. In some cases, the worst case evaluator process can be aware of a fixed number of candidate solutions to be evaluated at each iteration. The worst case evaluator process can track the number of candidate solutions within an iteration itself and determine when it has received figures of merit for all candidate solutions of an iteration.

At block 503, a loop of operations begins for each entry in the worst case structure. In this example illustration, the loop of operations includes blocks 505 and 507.

At block 505, it is determined whether the current worst figure of merit (i.e., the worst figure of merit observed in the current iteration) of the entry is worse than the previous worst figure or merit of the entry. If the current worst figure of merit is worse than the previous worst figure of merit then control flows to block 507. Otherwise, control flows to block 509.

At block 507, the previous worst formal parameter of the entry is set to the current worst figure of merit of the entry. For instance, the worst case evaluator process overwrites the previous worst figure of merit with the current worst figure of merit. Control flows from block 507 to block 509.

At block 509, it is determine whether all entries have been examined. If not, then control flows back to block 503. If so, then control flows to block 511 where it is indicated that the worst case structure has been updated. The indication can be used to allow the worst case evaluator process to being evaluating figures of merit from a next iteration.

Variations from Depicted Example Illustrations

Embodiments may manipulate figures of merit to further steer a metaheuristic optimizer to search for new worst observed figures of merit. When a candidate solution has actual design parameters that cause an update to the worst case structure, the worst case evaluator process can manipulate the figure of merit for the candidate solution or the candidate solution itself to increase the likelihood that the candidate solution will be used to advance the population of candidate solutions. For example, a worst case evaluator process may augment a figure of merit that is supplied to a metaheuristic advancer but not augment the figure of merit that is stored in the worst case structure. The worst case evaluator process can mark the candidate solution to be used in advancing the population of candidate solutions regardless of the figure of merit when the actual design parameters of the candidate solution cause an update to the worst case structure. This avoids corrupting the figures of merit. To prevent influence of unacceptable candidate solutions, thresholds can be defined to override marked candidate solutions. For example, the metaheuristic advancer will use a marked candidate solution to advance to a next iteration unless the figure of merit supplied for the candidate solution falls below a minimum acceptable figure merit, which would be distinct from a threshold used in selecting candidate solutions for advancing the population.

The example operations depicted in the flowcharts are intended to aid in understanding the inventive subject matter and should not be used to limit embodiments of the inventive subject matter. Embodiments may perform operations in a different order, in parallel, additional operations, or fewer operations. The example operations of FIG. 2 presume an implementation that passes each figure of merit to the worst case evaluator program instructions. Embodiments are not limited to a particular technique for passing input, though. Embodiments can pass the figures of merit in a batch to the program instructions that persist the worst observed figures of merit by actual design parameters. Also, embodiments may not discard a figure of merit as depicted with block 211 of FIG. 2. Embodiments may record the figure of merit for togging, analysis, or other purposes.

Multi-Deme Architecture

Figure 6:
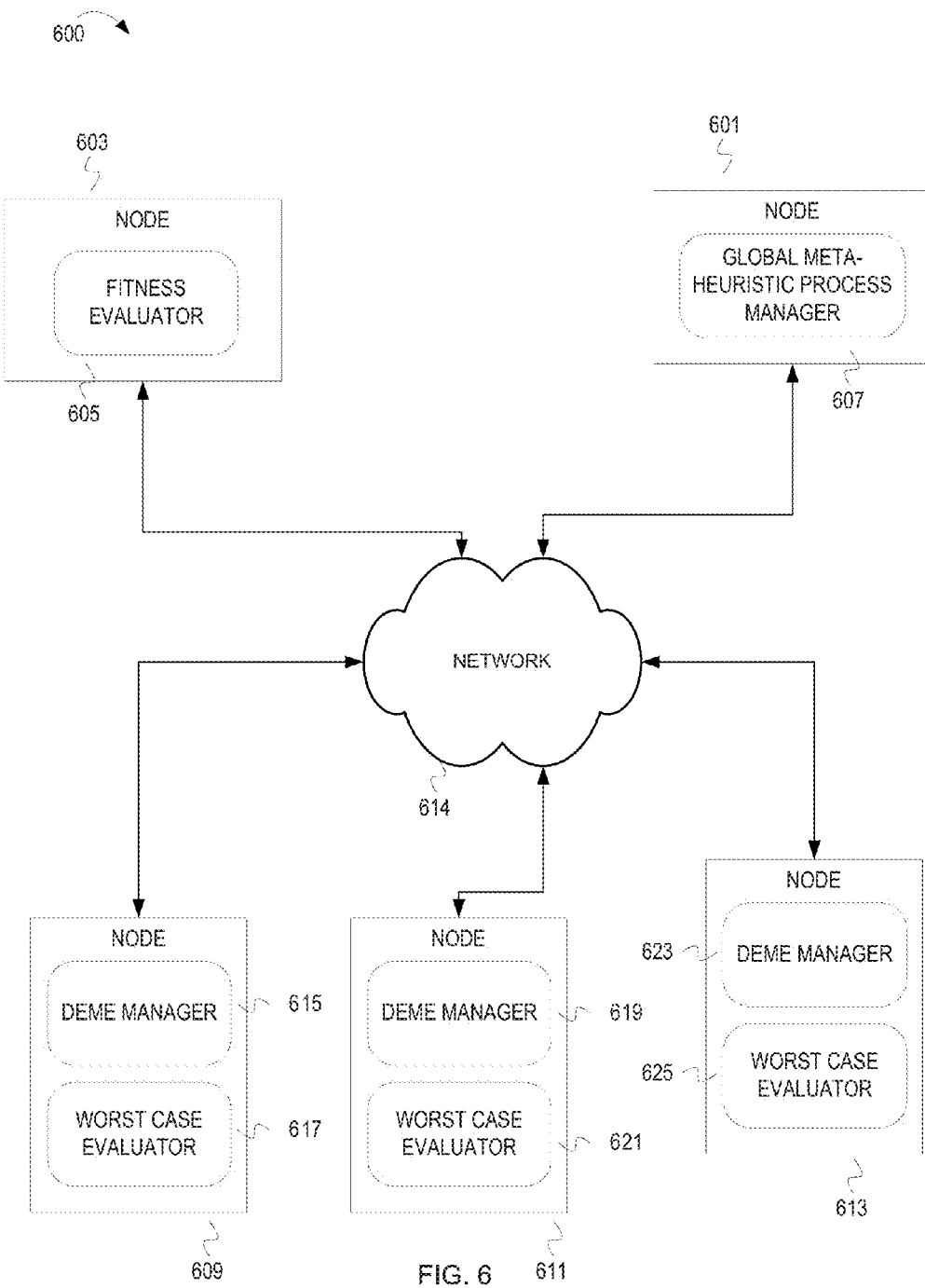
FIG. 6 depicts an example network of nodes carrying out a multi-deme model of a population-based metaheuristic optimization algorithm that uses worst case evaluators.

FIG. 6 depicts an example network of nodes carrying out a multi-deme model of a population-based metaheuristic optimization algorithm that uses worst case evaluators. A network of nodes 600 is depicted with several nodes communicatively coupled via a network 614, which can be implemented in accordance with any of a variety of network technologies. A node 601 hosts a global metaheuristic process manager 607. The global metaheuristic process manager 607 allocates and manages resources for the metaheuristic process and monitors progress and results of local denies. A node 603 hosts a fitness evaluator 605. The fitness evaluator 605 runs simulations and compute figures of merit based on a defined fitness function.

FIG. 6 depicts three nodes responsible for local demes. A node 609 hosts a deme manager 615 and a worst case evaluator 617. A node 611 hosts a deme manager 619 and a worst case evaluator 621. A node 613 hosts a deme manager 623 and a worst case evaluator 625. The deme managers each generate initial local demes or sub-populations, unless assigned to them by the global evolutionary process manager 607. Each of the deme managers reports progress of their local deme to the global evolutionary process manager periodically and/or in response to a request from the global evolutionary process manager 607. Each of the worst case evaluators influences searching of the optimization problem space by persisting worst observed figures of merit within their respective local dente. Each of the deme managers can invoke their corresponding worst case evaluators in a manner similar to that depicted in any of FIGS. 2-5. The network of nodes 600 depicted in FIG. 6 is an example and can take different forms or configurations. For example, multiple nodes may carry out fitness evaluation. The network can be configured to assign a fitness evaluator for a given number of demes, or even per dente.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
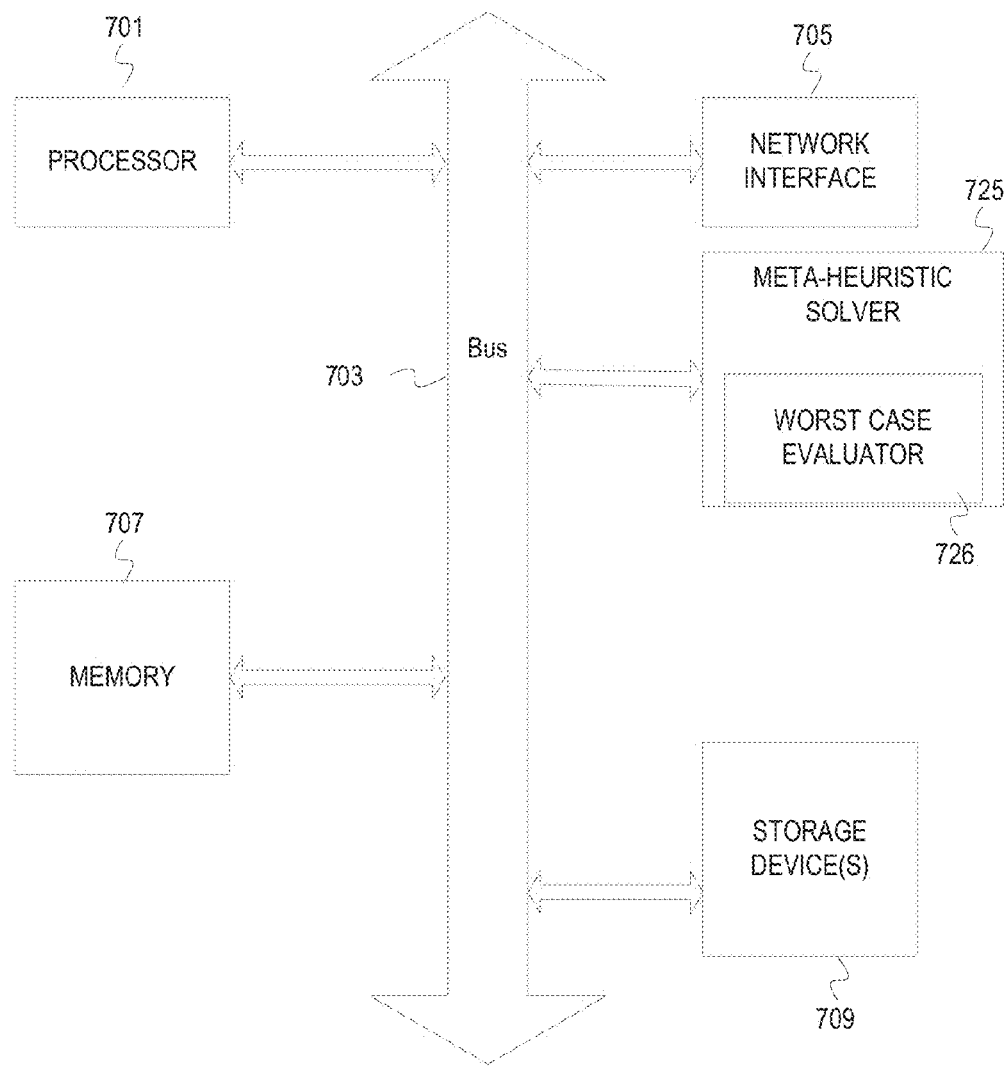
FIG. 7 depicts an example computer system with a metaheuristic solver that employs worst case evaluation.

FIG. 7 depicts an example computer system with a metaheuristic solver that employs worst case evaluation. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system also includes a metaheuristic solver 725. The metaheuristic solver 725 is depicted in this example as including a worst case evaluator 726. The metaheuristic solver 725 generates candidate solutions, evaluates candidate solutions, generates figures of merit, and performs operations to progress a metaheuristic instance. The worst case evaluator 726 persists worst observed figures of merit by actual design parameters to influence the metaheuristic solver 725 to explore worst case scenarios. The worst case evaluator 726 can also use the information about worst observed figures of merit to avoid simulations. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for steering a metaheuristic optimizer or solver to explore the worst cases in an optimization problem space as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for guiding a population-based metaheuristic search for an optimization problem, the computer program product comprising:
a computer readable storage device having computer usable program code embodied therewith, the computer usable program code comprising a computer usable program code to:
for each candidate solution in a current iteration of a population-based metaheuristic instance,
prior to evaluation of the candidate solution and generation of a figure of merit with the fitness function, determine whether the structure indicates a previously observed worst figure of merit for actual design parameters of the candidate solution that satisfied a threshold;
obviate evaluation of the candidate solution and supply the previously observed worst figure of merit associated with the actual design parameters of the candidate solution in the structure when the previously observed worst figure of merit satisfies the threshold;
determine whether a figure of merit generated from a fitness function of the population-based metaheuristic instance for the candidate solution is worse than a figure of merit associated with actual design parameters of the candidate solution in a structure used to track worst observed figures of merit by actual design parameters over iterations, wherein the actual design parameters are a subset of actual parameters of the candidate solution;

update the structure to associate the figure of merit with the actual design parameters when the figure of merit generated for the candidate solution in the current iteration is worse than a previously observed worst figure of merit for the actual design parameters in the structure; and supply, as a figure of merit to be used for the candidate solution in advancing the population-based metaheuristic instance, the worst between the figure of merit generated for the candidate solution in the current iteration and the previously observed worst figure of merit for the actual design parameters.

2. The computer program product of claim 1 further comprising computer usable program code to create an entry in the structure when the structure does not have an entry for actual design parameters of a candidate solution.

3. The computer program product of claim 2, wherein the computer usable program code to create the entry comprises computer usable program code to generate an index for the entry based, at least in part, on the actual design parameters of the candidate solution for which there was no entry.

4. The computer program product of claim 1, wherein the computer usable program code to supply the worst between the figure of merit generated for the candidate solution in the current iteration and the previously observed worst figure of merit for the actual design parameters comprises computer usable program code to update a second structure, which indicates figures of merit for candidate solutions of the current iteration of the population-based metaheuristic instance, to associate the candidate solution with the worst between the figure of merit generated for the candidate solution in the current iteration and the previously observed worst figure of merit for the actual design parameters.

5. The computer program product of claim 1 further comprising computer usable program code to:

augment the figure of merit to be supplied and used for a candidate solution in advancing the population-based metaheuristic instance when the figure of merit is the worst between the figure of merit generated for the candidate solution in the current iteration and the previously observed worst figure of merit for the actual design parameters of the candidate solution.

6. The computer program product of claim 1, wherein the computer usable program code to update the structure to associate the figure of merit with the actual design parameters when the figure of merit generated for the candidate solution in the current iteration is worse than a previously observed worst figure of merit for the actual design parameters in the structure comprises computer usable program code to update the structure to associate the figure of merit with the actual design parameters when the figure of merit generated for the candidate solution in the current iteration is worse than a previously observed worst figure of merit for the actual design parameters in the structure and a worst of the figures of merit observed in the current iteration for the actual design parameters.

7. The computer program product of claim 6 further comprising computer usable program code to:

after figures of merit have been generated for the candidate solutions of the current iteration of the population-based metaheuristic instance, for each entry of the structure that indicates a worst figure of merit observed in the current iteration for actual design parameters corresponding to the entry that is worse than the previously observed worst figure of merit for the actual design parameters corresponding to the entry, update the previously observed worst figure of merit to be the worst figure of merit observed in the current iteration.

8. An apparatus for guiding a population-based metaheuristic search for an optimization problem, the apparatus comprising:

a processor;

a network interface; and a computer readable storage medium having computer usable program code embodied therewith, the computer usable program code comprising a computer usable program code to:

for each candidate solution in a current iteration of a population-based metaheuristic instance, prior to evaluation of the candidate solution and generation of a figure of merit with the fitness function, determine whether the structure indicates a previously observed worst figure of merit for actual design parameters of the candidate solution that satisfied a threshold;

obviate evaluation of the candidate solution and supply the previously observed worst figure of merit associated with the actual design parameters of the candidate solution in the structure when the previously observed worst figure of merit satisfies the threshold;

determine whether a figure of merit generated from a fitness function of the population-based metaheuristic instance for the candidate solution is worse than a figure of merit associated with actual design parameters of the candidate solution in a structure used to track worst observed figures of merit by actual design parameters over iterations, wherein the actual design parameters are a subset of actual parameters of the candidate solution;

update the structure to associate the figure of merit with the actual design parameters when the figure of merit generated for the candidate solution in the current iteration is worse than a previously observed worst figure of merit for the actual design parameters in the structure; and supply, as a figure of merit to be used for the candidate solution in advancing the population-based metaheuristic instance, the worst between the figure of merit generated for the candidate solution in the current iteration and the previously observed worst figure of merit for the actual design parameters.

9. The apparatus of claim 8 further comprising computer usable program code to:

augment the figure of merit to be supplied and used for a candidate solution in advancing the population-based metaheuristic instance when the figure of merit is the worst between the figure of merit generated for the candidate solution in the current iteration and the previously observed worst figure of merit for the actual design parameters of the candidate solution.

10. The apparatus of claim 8, wherein the computer usable program code to update the structure to associate the figure of merit with the actual design parameters when the figure of merit generated for the candidate solution in the current iteration is worse than a previously observed worst figure of merit for the actual design parameters in the structure comprises computer usable program code to update the structure to associate the figure of merit with the actual design parameters when the figure of merit generated for the candidate solution in the current iteration is worse than a previously observed worst figure of merit for the actual design parameters in the structure and a worst of the figures of merit observed in the current iteration for the actual design parameters.

11. The apparatus of claim 10 further comprising computer usable program code to:

after figures of merit have been generated for the candidate solutions of the current iteration of the population-based metaheuristic instance, for each entry of the structure that indicates a worst figure of merit observed in the current iteration for actual design parameters corresponding to the entry that is worse than the previously observed worst figure of merit for the actual design parameters corresponding to the entry, update the previously observed worst figure of merit to be the worst figure of merit observed in the current iteration.

\* \* \* \* \*